May 6, 1924.
M. BIRKIGT
CLUTCH
Filed Jan. 16. 1922
1,493,237
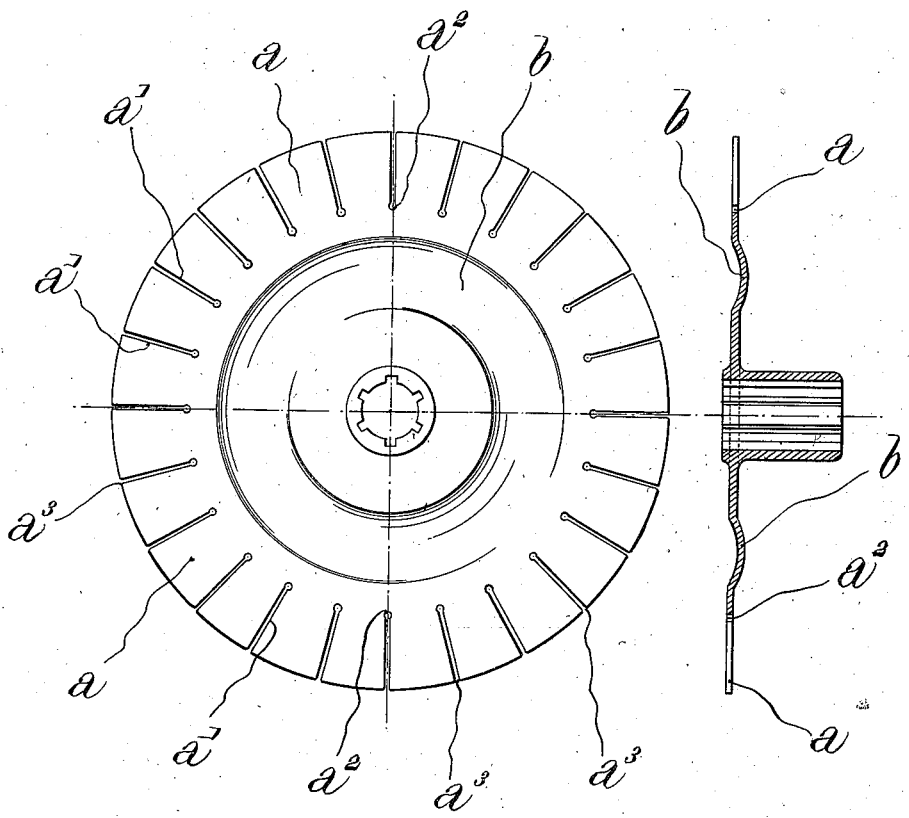
Inventor
Marc Birkigt
By James L. Norris,
Attorney Patented May 6, 1924.

1,493,237

UNITED STATES PATENT OFFICE.

MARC BIRKIGT, OF BOIS COLOMBES, FRANCE.

CLUTCH.

Application filed January 16, 1922. Serial No. 529,714.

*To all whom it may concern:*

Be it known that I, MARC BIRKIGT, a citizen of the Republic of Switzerland, residing in Bois Colombes, France, have invented certain new and useful Improvements in Clutches, of which the following is a specification.

The invention relates to apparatus comprising at least one rotary disc; and it relates more particularly but not exclusively to discs to be used between clutches comprised of two rings or plates at a distance apart modifiable at will.

An object of the invention is to improve apparatus of this sort so that it will work better than apparatus heretofore invented and consists chiefly in providing discs which have radial slots and contemplates certain methods of applying such discs as well as certain methods of attaining the objects just referred to. The invention relates further to a device of the character indicated for attaining the objects mentioned, as well as to special elements suitable for constructing such apparatus.

It will be clearly understood from the description which follows, taken with the accompanying drawing forming a part of the specification and illustrating one form of my invention and in which;

Figures 1 and 2 of the said drawings are, respectively, a front elevation and axial section of the disc for use with a clutch of the above mentioned type.

According to the invention, a single disc is formed, which disc is adapted to be placed between two rings arranged at a distance apart which is adjustable at will.

In the embodiment shown I provide a disc $a$, preferably of sheet steel and having a plurality of radial slots $a^1$. These slots may be either plain or, as shown in the drawing, each may terminate at its inner end in an aperture $a^2$ and have a chamfered portion $a^3$ at the periphery of the disc.

The disc may further be formed with an annular rib of curved cross-section.

Owing to said curvature when the disc is placed between the two rings of a clutch, a clutch disc is produced which has the advantages of being entirely free from liability to warp, under the action of the heat generated by its operation, even when made very thin; of having smaller inertia for the same thickness; and of making it possible, in view of the existence of the said annular part, on the one hand, to make use of the said part as a path for the free passage of parts such as for instance nuts provided on one of the rings, and at the same time producing a clutch of smaller axial dimension than usual; the annular part contributing moreover to the stiffening of the disc.

The invention is not limited to the use in the specific relationship set forth above, but comprises on the contrary any clutch relationship in which it could be applied, for example, to clutches which comprise multiple discs.

I claim:—

A clutch disc for use with a clutch device, comprising a thin disc for insertion between a plurality of rings which are separable for a variable distance, said disc having an annular concave zone and having at its edge radial slots terminating at their bases in apertures and terminating at the circumference of the disc in obliquely widened portions.

In testimony whereof I have hereunto set my hand.

MARC BIRKIGT.